United States Patent [19]

Shepler et al.

[11] Patent Number: 4,598,355

[45] Date of Patent: Jul. 1, 1986

[54] FAULT TOLERANT CONTROLLER

[75] Inventors: John E. Shepler; Douglas A. Rinker, both of Rockford; Bruce D. Beneditz, Roscoe; John J. Vicari; Dennis T. Faulkner, both of Rockford, all of Ill.

[73] Assignee: Sundstrand Corporation, Rockford, Ill.

[21] Appl. No.: 545,901

[22] Filed: Oct. 27, 1983

[51] Int. Cl.[4] .................... G05B 9/02; G05B 23/02; G06F 11/00
[52] U.S. Cl. ................... 364/184; 364/186; 364/431.01; 371/14; 371/62
[58] Field of Search .................... 364/184–187, 364/431.01, 431.02, 424, 557; 318/563; 371/7, 14–16, 20, 62; 340/507

[56] References Cited

U.S. PATENT DOCUMENTS

| 4,071,897 | 1/1978 | Groves, Jr. et al. | 364/494 |
|---|---|---|---|
| 4,117,459 | 9/1978 | Douglas et al. | 371/16 |
| 4,118,792 | 10/1978 | Struger et al. | 364/184 X |
| 4,191,913 | 3/1980 | Arnold et al. | 318/563 |
| 4,298,938 | 11/1981 | Wang et al. | 371/14 X |
| 4,377,845 | 3/1983 | Markham et al. | 371/16 X |
| 4,398,233 | 8/1983 | Bala et al. | 364/186 X |
| 4,409,635 | 10/1983 | Kraus | 364/186 X |
| 4,477,870 | 10/1984 | Kraus | 364/186 |

FOREIGN PATENT DOCUMENTS 143657 11/1980 Japan ..................... 371/14

Primary Examiner—Joseph Ruggiero
Attorney, Agent, or Firm—Wood, Dalton, Phillips, Mason & Rowe

[57] ABSTRACT

A controller operable in a normal mode of operation to control an output device in response to a sensed condition includes means for detecting a fault in the controller or output device. Means are responsive to the fault detecting means for controlling the output device in a failsafe mode of operation wherein the output device is safely operated without regard to the sensed condition when a fault is detected. Means responsive to the fault detecting means causes a return to the normal mode of operation only if the existence of the fault can be detected while in the failsafe mode and the fault ceases to exist during such time.

9 Claims, 10 Drawing Figures

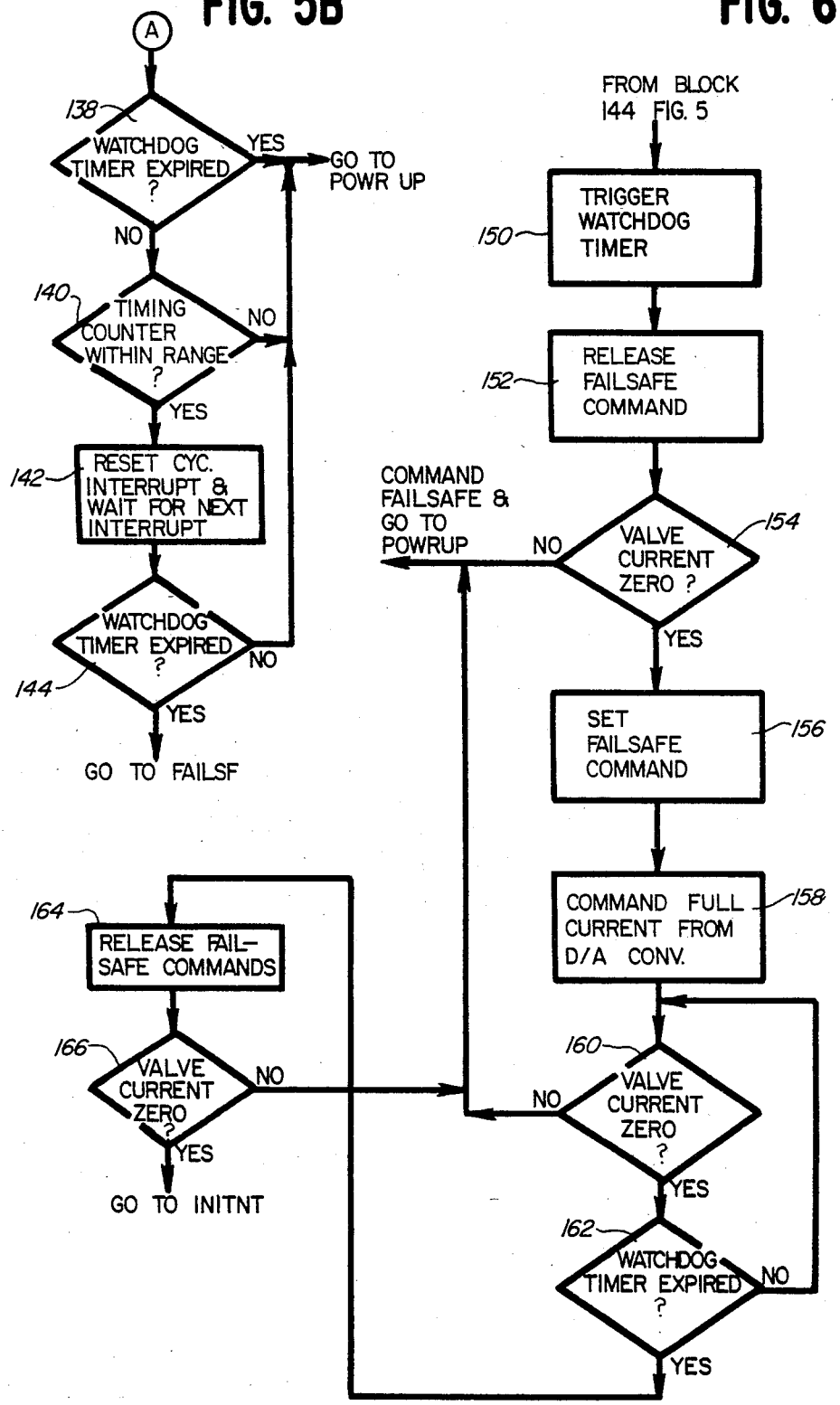

FAULT TOLERANT CONTROLLER

BACKGROUND OF THE INVENTION

The present invention relates generally to control systems, and more particularly to a control system which can recover from faults or upsets with a minimum of manual intervention.

Control systems are often required to control an output device under conditions which may induce faults or transient upsets within the system. One example of such a control system is an engine bleed air control system in an aircraft for controlling the temperature of compressed bleed air from an engine. In such a case, the control system may be subjected to electrical transient upsets, nuclear transient upsets, sensor faults or other kinds of faults and upsets which may affect the temperature control function. It is important that such faults and upsets not cause a bleed air overtemperature condition which could have serious consequences.

SUMMARY OF THE INVENTION

In accordance with the present invention, a control system for operating an output device in response to at least one sensed condition includes means for determining the operational capability of various components of the system. Means are provided for safely operating the output device in a failsafe state without regard to the sensed condition in the event a fault is detected.

A first set of test procedures is performed upon system startup. The control system includes a controller which is implemented in part by a microprocessor and includes a watchdog timer which generates a nonmaskable interrupt signal in the event the microprocessor does not initiate consecutive execution cycles within a particular period of time. The lengths of time between successive execution cycle interrupts and the watchdog timer interrupts are checked to determine whether they are within particular ranges. If either is not, the system is reinitialized and the output device is operated in the failsafe state so that a dangerous condition does not arise due to the fault. This condition persists until the durations between successive execution cycle interrupts and watchdog timer interrupts are within range, indicating that the fault has cleared.

The output device can be placed in the failsafe state by any one of a plurality of means. The operational capability of each of these means is checked, and if any of these means is found defective, all of the means are instructed to place the output device in the failsafe state to prevent the occurrence of a dangerous condition.

A series of operational tests are then conducted once for each program cycle. For example, in the case of an engine bleed air control system which controls an air valve in accordance with sensed conditions, such as the position of the valve and the temperature of bleed air downstream from a precooler, the operational capability of each of several components including a valve position sensor and a temperature sensor is checked. If a fault is detected, a temporary failsafe flag is set to cause the valve to assume a failsafe state in which the valve is fully open to provide maximum cooling for the bleed air. All of the components conditions are sequentially rechecked and if the fault subsequently clears, the temporary failsafe flag is reset, thereby permitting the valve to be controlled in accordance with the sensed conditions.

Additional operational tests are conducted, and if a fault is detected during these tests, a permanent failsafe flag is set which permanently causes the output device to be operated in the failsafe state without regard to the sensed conditions until power is subsequently removed and reapplied to the control system. In the case of the engine bleed air system noted above, these additional operational tests determine the operational capability of the valve itself by comparing the actual valve current with a commanded current and by checking the valve position as a function of temperature. If these tests detect a fault in the valve, then the valve is failsafed. Since the operational capability of the valve cannot thereafter be checked, the failsafe state is permanently commanded.

A control system incorporating the above test procedures can operate under fault-producing conditions with a minimum of manual intervention and can automatically recover from certain faults and upsets. The control system will not cause a dangerous operating condition to arise in the event of a fault or upset as noted above.

BRIEF DESCRIPTION OF THE DRAWINGS

FIG. 4 is flow chart illustrating the general operation of the controller shown in FIG. 2;

FIGS. 5A–5B, when joined along similarly lettered lines, comprise a flow chart of the TIMING module shown in FIG. 4;

FIG. 6 is a flow chart of the FAILSF module shown in FIG. 4;

DESCRIPTION OF THE PREFERRED EMBODIMENT

Figure 1:
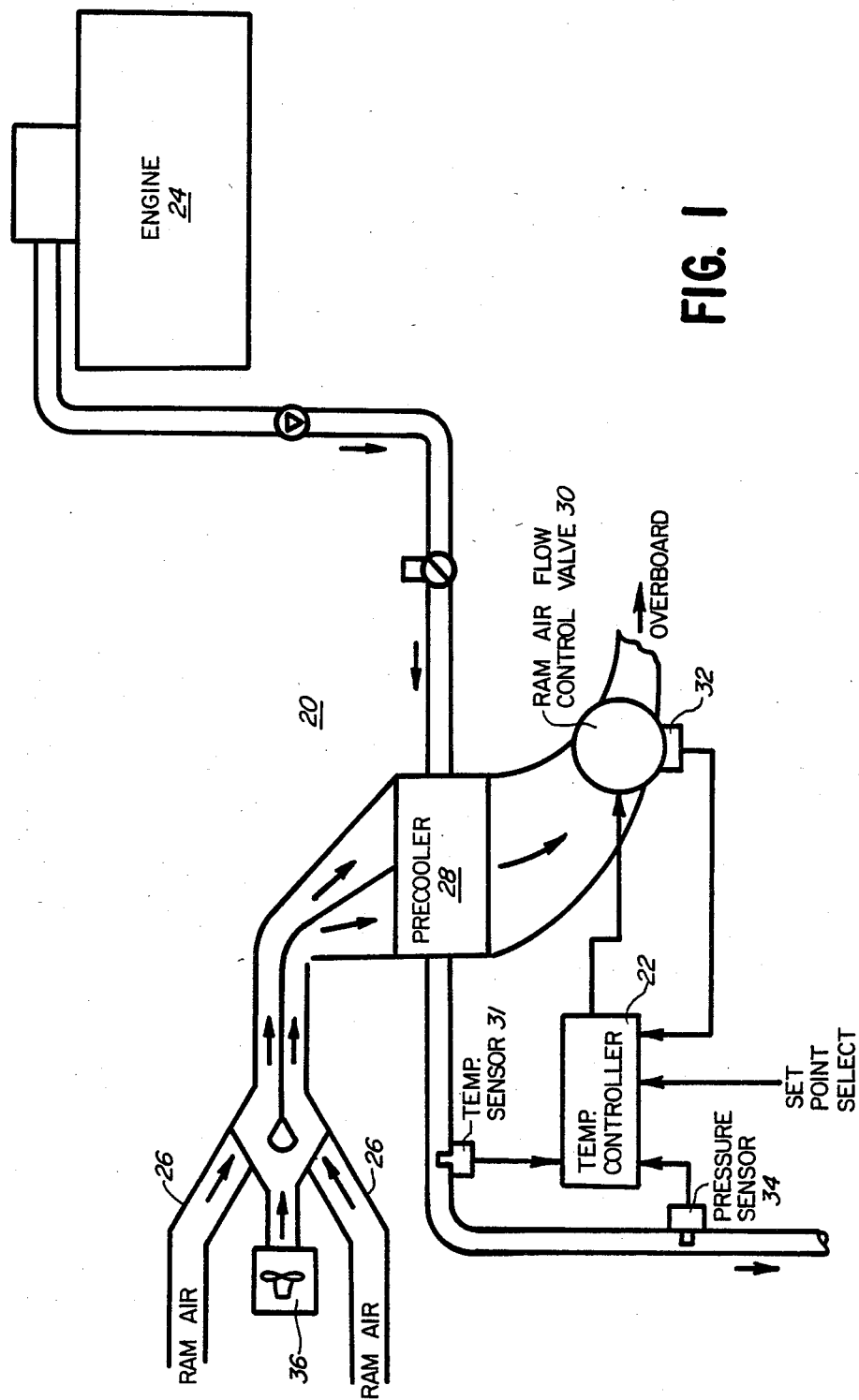
FIG. 1 is a block diagram of an engine bleed air control system which incorporates a controller according to the present invention.

Referring now to FIG. 1, there is shown an example of a control system 20 which may incorporate a controller 22 according to the present invention. The controller in the present example is utilized to control the cooling of bleed air from an engine 24 in an aircraft. It should be noted that the inventive concepts disclosed herein are equally adaptable to other types of control systems which operate under fault-producing conditions.

The control system 20 controls the temperature of bleed air from the engine 24 by controlling the flow of ram air in ducts 26 through a heat-exchanger or precooler 28. This air flow is controlled by an output device of the control system in the form of a ram air flow control valve 30. The controller 22 controls bleed air temperature in response to a manually selectable set point. The flow control valve 30 is normally controlled in accordance with sensed conditions, such as the sensed temperature downstream from the precooler 28 as detected by a temperature sensor 31 and the position of the valve as detected by the position sensor 32.

The controller 22 may also perform secondary functions which are nonessential to the performance of the primary function of controlling bleed air temperature. For example, the controller 22 may sense the pressure downstream of the precooler 28 by means of a pressure sensor 34 and sense the speed of a ground blower 36 which permits cooling of bleed air even when the aircraft is stationary on the ground.

The controller 22 may also communicate with a central onboard computer 40 which checks various operational parameters of the aircraft. The central computer 40 may, for example, check the status of the conditions detected by the temperature, position and pressure sensors 31,32,34, respectively, and/or the speed of the ground blower 36. This communications function is also a secondary function which is nonessential to the primary function.

The system shown in FIG. 1 may be operated under fault-producing conditions which may affect the primary and secondary functions. Such fault conditions may include electromagnetic or nuclear transients, sensor faults, faults in the combinations link between the controller 22 and the central computer 40 and faults caused by external power being out of an allowable range. It is important that such faults not cause the valve 30 to be operated such as to cause the bleed air to rise to unacceptable temperatures.

The controller of the present invention eliminates the possibility of a dangerous condition arising as a result of a fault by causing the valve 30 to assume a failsafe state in which the valve is fully opened to provide maximum cooling in the precooler 28 when a fault is detected.

Figure 2:
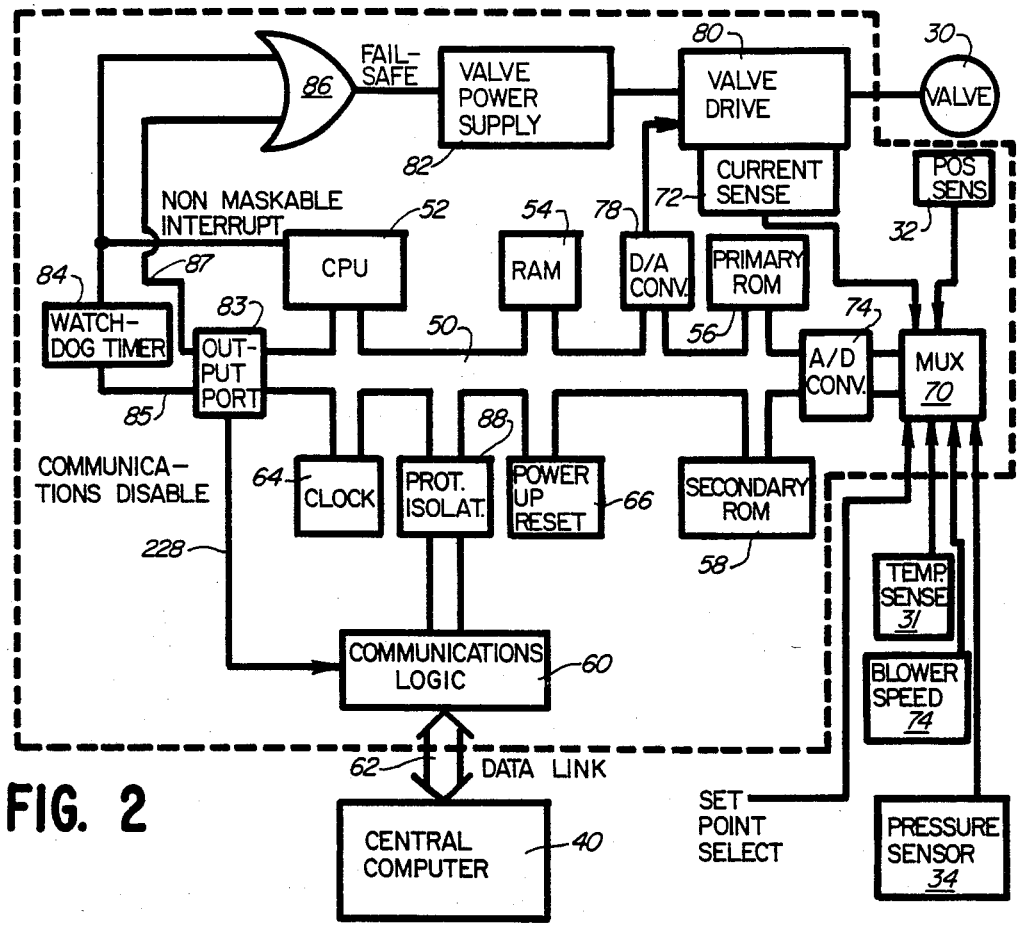
FIG. 2 is a block diagram of the controller shown in FIG. 1.

Referring now to FIG. 2, the controller 22 shown in dashed lines includes a series of discrete logic devices which are interconnected by a bus 50 to form a microcomputer. The controller 22, shown in dashed lines in FIG. 2, may alternatively be implemented by a singlechip microprocessor and appropriate power supply and drive circuits for the valve, if desired.

The controller 22 includes a central processing unit, or CPU 52 which communicates over the bus 50 with a random access memory, or RAM 54 and a pair of read only memories, or ROM's 56,58. The RAM 54 contains the registers for flags and various intermediate and final results of the control process. The operating program for the primary function of the controller is stored in the ROM 56. A separate operating program is stored in the ROM 58 for secondary functions, such as to allow communications between the controller 22 and the central computer 40 by means of communications logic 60 and a data link 62.

The programs for the primary and secondary functions are stored in separate memories 56,58 so that, in the event there is a fault in a secondary function, the ROM 58 can be disabled without affecting the primary control process. It should be noted that the RAM memory can also be split into two RAM units, one for the primary function and one for the secondary functions, if desired.

The controller includes a clock 64 which controls the execution timing of the operating programs stored in the ROM's 56 and 58. A power up reset circuit 66 generates a signal to cause the controller to perform a power up routine, described in more detail hereinafter, upon initial application or an interruption of power to the controller.

A multiplexer 70 receives signals representing the manually selectable set point, the temperature downstream of the precooler 28 as detected by the temperature sensor 31, the position of the valve as detected by the position sensor 32 and the current delivered to the valve as detected by a current sensor 72. The multiplexer 70 also receives inputs from the pressure sensor 34 and a blower speed sensor 74 which detects the speed of the ground blower 36. The information received by the multiplexer 70 is converted to digital information by an A/D converter 76 and is made available to various components of the controller over the bus 50.

The valve position is primarily controlled through a digital to analog converter 78 which transmits a control signal to a valve drive circuit 80, which in turn modulates the flow of power from a valve power supply circuit 82 to the valve 30 in dependence upon the level of the control signal.

The position sensing circuit 32 comprises a rotary variable differential transformer, or RVDT, which includes an excitation winding and two secondary windings which are linked by a core movable with the valve. Movement of the valve 30 causes a change in coupling between the excitation winding and each of the secondary windings, and the output from the secondary windings, designated RVDT A and RVDT B, are sensed to determine the position of the valve.

The bus 50 also communicates through an output port 83 to a watchdog timer 84. The timer 84 is utilized to detect faults which affect the execution cycle time of the program stored in the ROM 56. The watchdog timer 84 is a monostable multivibrator which generates a watchdog signal if an execution cycle interrupt signal over a line 85 is not received to reset the timer within a particular time period following the last interrupt.

In the preferred embodiment, the watchdog timer duration is approximately equal to 1.5 times the execution cycle time. The watchdog interrupt signal is a nonmaskable interrupt and is coupled to the CPU 52 which takes appropriate action, as noted more specifically below.

The pulse from the watchdog timer 84 is also connected through an OR gate 86 to the valve power supply circuit 82 to cause the power supply output to be disabled. This in turn causes the valve 30 to assume the failsafe state wherein the valve is fully open and maximum cooling is provided for the bleed air.

The failsafe condition can also be commanded over a separate output line 87 from the output port 83 and through the D/A converter 78. In summary, the valve can be operated in a safe condition and operated without regard to the sensed condition by any one or more of three independently operable means, i.e. the D/A condition 78, the output port 83 and the watchdog timer 84.

Figure 3:
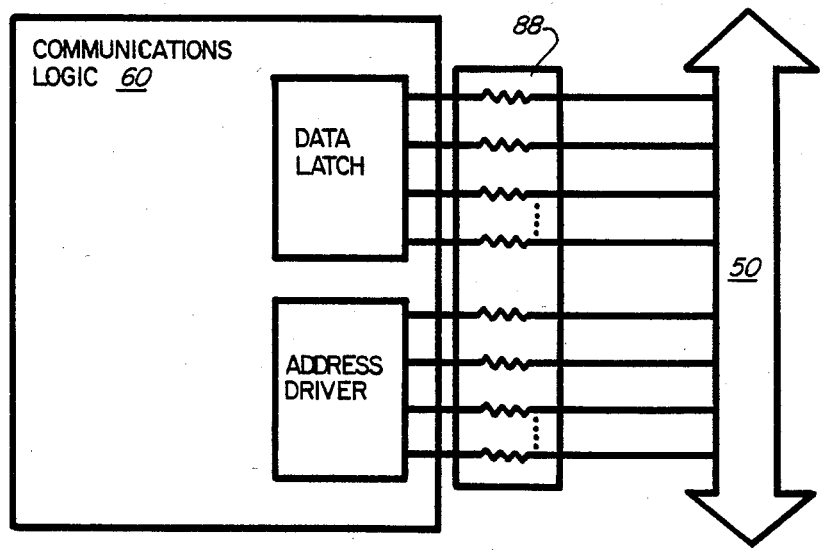
FIG. 3 is a block diagram of the communications logic, protective isolation circuit and the bus shown in FIG. 2.

Referring also to FIG. 3, the communication logic circuit 60 is coupled through a series of resistors 88 which together comprise a protective isolation circuit. The communication logic 60 can be disabled in the event of a fault therein or in the secondary ROM 58 by means of a disable signal coupled over a line 228. In the event of such a fault, the resistors 88 isolate the bus 50 from data latch and address driver circuits in the communications logic 60 to prevent the fault from affecting the primary control function.

Figures 4, 5A:
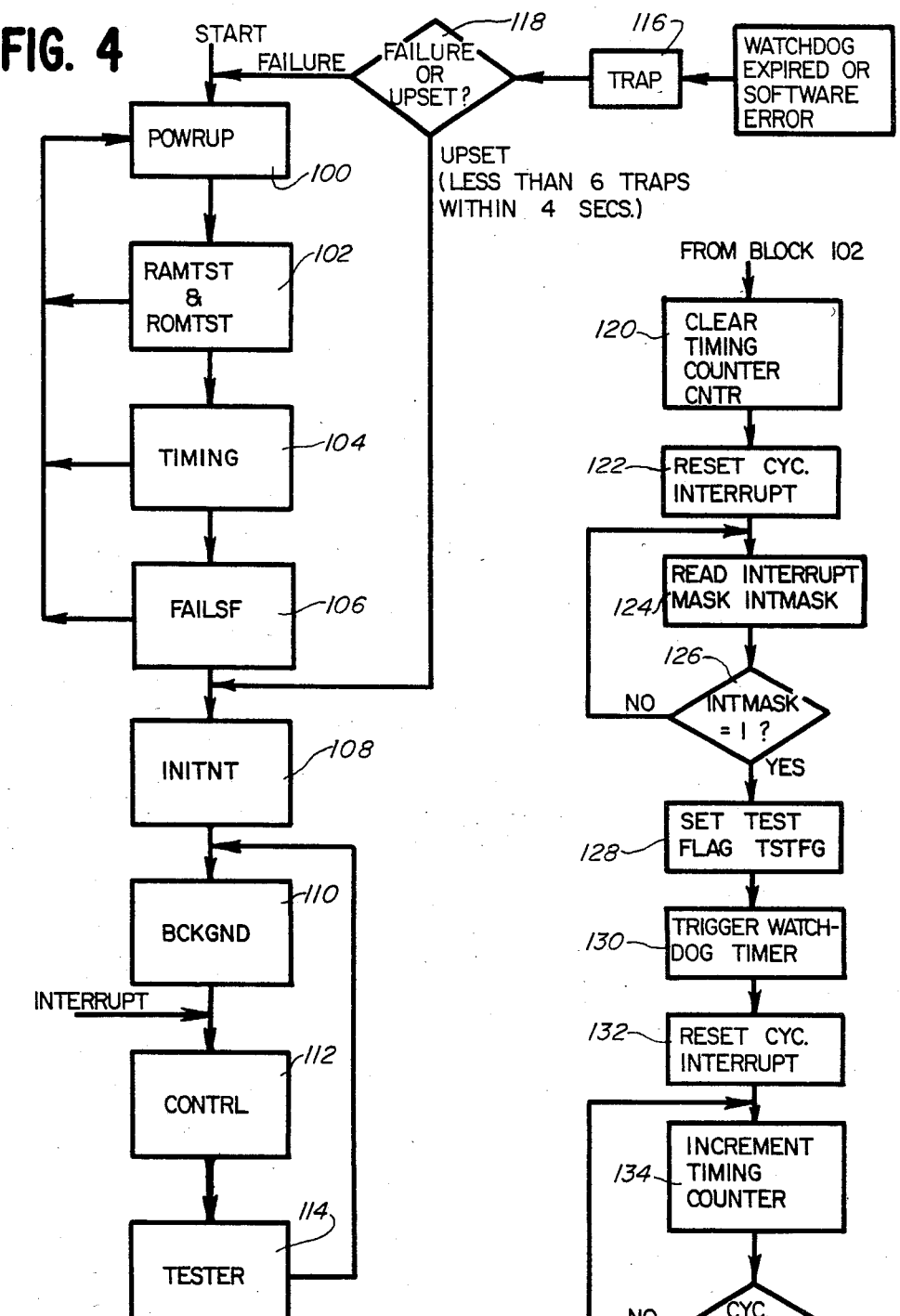

Referring now to FIG. 4, there is illustrated a generalized flow chart of the program stored in the control ROM 56 shown in FIG. 2. The program consists of a series of modules or subroutines, some of which are executed only upon system initialization or upon a system reset and others of which are performed continuously during controller operation.

The first module, denoted POWRUP, block 100, detects when power is applied to the controller and has stabilized. This is accomplished by sensing an the output of the power up reset circuit 66 which assumes a high state until power to the controller is stable and within particular limits. When this output assumes a low state, a signal is developed at the output port 83. This signal is coupled through the OR gate 86 to the valve power supply 82 to disable same and cause the valve 30 to move to its fully open, or failsafe, position. The valve 30 remains in this position until all of the initialization modules have completed their tasks.

A block 102 then checks the RAM and ROM memories. The RAM 54 is checked by writing to each of the RAM locations and subsequently reading back the information to determine if any of the information has changed since it was written. If none of this information changes, then the RAM 54 is assumed to be operable.

The control and communications ROM 56,58 are then checked by summing the contents of each and comparing the sum against a check sum. If the contents sum is equal to the check sum, then the memory is assumed to be operative and control passes to the next module, denoted TIMING, block 104.

If any memory element is determined to be faulty, control returns to the POWRUP module, block 100.

The module TIMING, described more specifically below in connection with FIGS. 5A and 5B, checks the interval that is timed by the watchdog timer 84 and additionally checks the length of time between successive execution cycle time interrupts generated by the controller 22.

Following the TIMING module, a module denoted FAILSF, block 106, described more specifically in connection with FIG. 6 below, checks the ability of the watchdog timer 84, the output port 83 and the D/A converter 78 to independently cause the valve 30 to assume the failsafe state. If a failure detected by either of the TIMING and FAILSF modules, control returns to the POWRUP module, block 100.

In the event no faults are detected by any of the previously described modules, control passes to an initialization procedure, denoted INITNT, block 108 which initializes the various flags and variables used in the control process.

A block 110, denoted BCKGND, then performs a series of background tests on the control portions of the RAM and ROM memories 54,78. RAM is tested by writing and reading a checkerboard pattern to each memory location. The data that was originally stored in RAM is saved in the processor registers and restored when the location has been tested. Control ROM is tested by the check sum method used in the POWRUP module. If a failure occurs in memory, a ROM or RAM flag stored in the RAM is set.

Upon generation of an execution cycle time interrupt by the clock 64 shown in FIG. 2, a module designated CONTRL, block 112, performs the primary control function of regulating bleed air temperature.

Following the CONTRL module, a module designated TESTER, block 114, checks the operability of various components associated with the primary control function. This module, described in more detail below in connection with FIGS. 7A-7C, checks as to whether the position sensor, the temperature sensor or the valve have failed. Depending upon the results of these tests, various failure flags are set or reset, as appropriate, and control returns to the BCKGND module, block 110, which continues the background memory tests.

In the event that the clock 64 does not generate a cycle interrupt within the timing period of the watchdog timer 84, or in the event of a software error as detected in BCKGND, a module TRAP, block 116, counts the number of faults of this type and causes a branching of control to either the POWRUP module, block 100, or the INITNT module, block 108, depending upon the number of faults which have occurred within a particular time period. In general, if six or more faults of this type occur within four seconds, the program branches to the POWRUP module 100 to rerun the initialization module tests. On the other hand, if less than six faults of this type occur within four seconds, the flags and registers in RAM are merely initialized and the POWRUP through FAILSF modules are not executed.

Referring now to FIGS. 5A and 5B, there is illustrated a flow chart of the TIMING module, block 104 in FIG. 4.

A block 120 clears a register in the RAM which operates as a timing counter, designated CNTR. A block 122 then resets an internal flip-flop in the controller to eliminate any pending cycle interrupts. A pair of blocks 124 and 126 then determine when the next interrupt occurs by reading an interrupt mask INTMASK which is set true when the cycle interrupt is generated. Immediately upon this occurrence, a test flag TSTFG is set by a block 128 and the watchdog timer 130 is triggered to begin timing of a test period. Additionally, a block 132 resets the cycle interrupt flip-flop.

The timing counter CNTR is incremented by a block 134 and continues to be incremented until the next cycle interrupt is generated.

When the second interrupt occurs, the status of watchdog timer 84 is checked by a block 138, FIG. 5B, which senses the output thereof to determine whether or not it has timed out. As previously noted, the watchdog timer duration is approximately 1.5 times the length of time between successive cycle interrupts, and hence if the timer has elapsed, this indicates that the watchdog timing components have failed so as to cause a quick timeout. In this event, control passes back to the POWRUP module, block 100, FIG. 4, to return the system initialization tests and to reset the controller.

If the watchdog timer has not elapsed at this time, the accumulated total of the timing counter CNTR is checked by a block 140 to determine whether the total is within a narrow range that reflects the tolerance of the system clock. If the total of the timing counter is not within a particular range, then a fault has occurred which affects cycle execution time and hence control is returned to the POWRUP module, block 100.

If the block 140 determines that there is no fault which affects cycle time, the cycle interrupt flip-flop is reset and control pauses until the next cycle interrupt is received. A block 144 then determines whether the watchdog timer has expired. Since the timing period of the watchdog timer is approximately 1.5 times the duration between successive cycle interrupts, the watchdog timer should have timed out. If this is the case, control passes to the FAILSF module to continue the initialization tests. If not, control passes back to the POWRUP module, block 100 in FIG. 4, to reinitialize the system and rerun the various initialization tests.

Referring now to FIG. 6, there is illustrated the FAILSF module shown as block 106 in FIG. 4. Following the block 144 in the TIMING module, a block 150 triggers the watchdog timer 84 by generating a signal over the line 84. A block 152 then causes the line 87 from the output port 83 to assume a low state and thereby remove the failsafe command from the valve power supply 82.

A block 154 checks to determine whether the valve current is zero by detecting the output of the current sensing circuit 72 through the multiplexer 70 and the A/D converter 74. At this point, the level of the control signal from the D/A converter 74 is at zero while the output of the valve power supply 82 is fully on. If the valve current is not zero, then the D/A converter signal cannot failsafe the valve 30 through the valve drive circuit 80, and hence a fault has occurred. Control then passes back to the POWRUP module, block 100 in FIG. 4 to failsafe the valve 30 and rerun the initialization tests.

If the block 154 determines that the valve current is zero, then the failsafe command is set by a high state signal on the line 87 from the output port 83. At this time, the output from the watchdog timer 84 is in a low state and a block 158 causes the control signal from the D/A converter 78 to be fully on at a level of approximately 100 milliamps. A block 160 then checks to determine whether the valve current 30 is equal to zero. If this is not the case, then the failsafe command on the line 87 from the output port 83 cannot failsafe the valve 30. This fault condition causes control to pass back to the POWRUP module.

A block 162 then determines whether the watchdog timer has elapsed. If it has not, control cycles through the blocks 160 and 162 until the watchdog timer times out. A block 164 then releases the failsafe command by removing the high state signal from the line 87 and causes the control signal from the D/A converter 78 to drop to zero. A block 166 then checks to determine whether the valve current is equal to zero by detecting the output of the current sensing circuit 72. If this is not the case, then the watchdog timer cannot failsafe the valve, and control returns to the POWRUP module, block 100 in FIG. 4. If the valve current is zero, then control passes to the INITNT module, block 108 in FIG. 4.

If, in the FAILSF module, control passes back to the POWRUP module from the blocks 154, 160 or 166, then a failsafe state is commanded for the valve 30 by placing high state signals on each of the lines 85 and 87 and by commanding full current from the D/A converter 78. This is necessary since the ability to failsafe the valve 30 is an important part of the operation of the control system. Accordingly, if any one of the three ways of causing the valve to assume the failsafe state is faulty, then all three are instructed to failsafe the valve until the fault clears.

After the FAILSF routine shown in FIG. 6, the valve 30 is commanded to the failsafe state and control passes to the INITNT module, block 108. The valve remains in the failsafe state until the CONTROL module 112 is reached, at which point the valve is controlled in accordance with sensed conditions, as before noted.

Figure 7A:
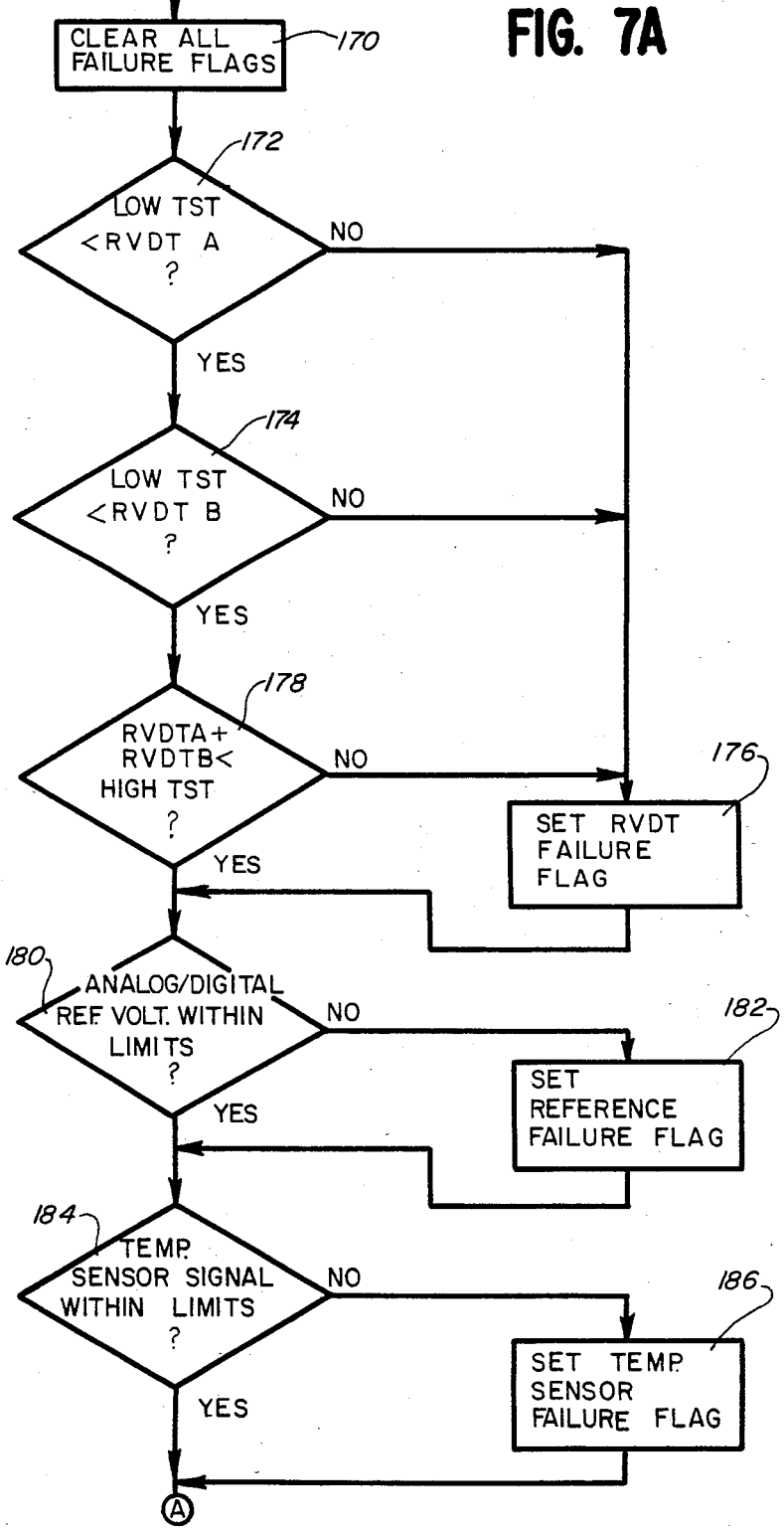
FIGS. 7A–7C, when joined along similarly lettered lines, comprise a single flow chart of the TESTER module shown in FIG. 4.
Figure 7B:
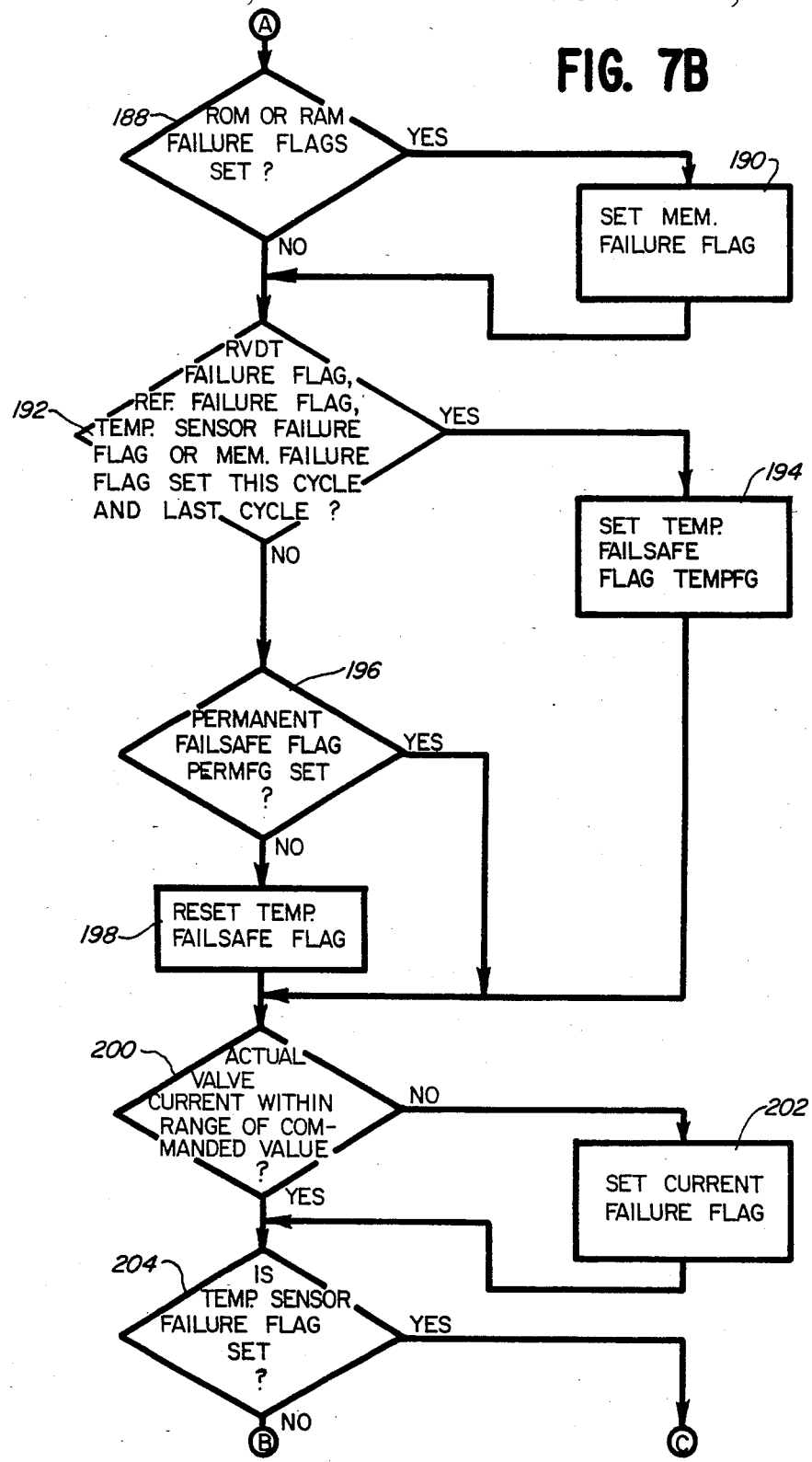
Figure 7C:
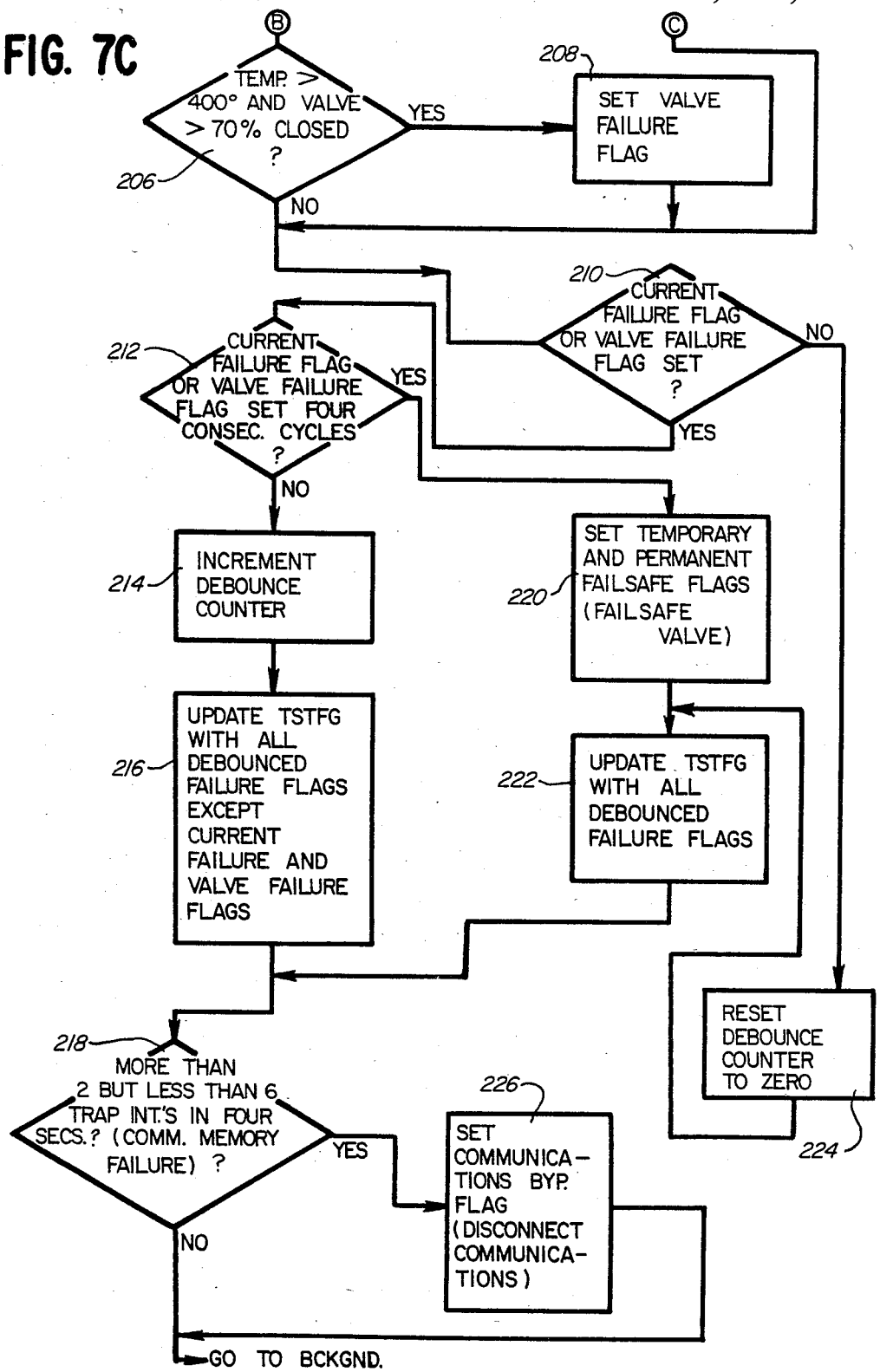

Referring now to FIGS. 7A-7C, there is illustrated the TESTER module, block 114 of FIG. 4.

Referring specifically to FIG. 7A, a block 170 clears a series of registers in the RAM 54 which store a plurality of failure flags which are set or reset depending on the determinations made in during the last execution cycle through TESTER module. The contents of these registers are saved in intermediate registers for comparison with later results, as noted more specifically below.

A pair of blocks 172 and 174 sense the outputs RVDT A and RVDT B from the secondary windings of the RVDT through the multiplexer 70 and A/D converter 74 and compare these values against a value stored in the ROM 56 designated LOWTEST. If either of these values is less than LOWTEST, then control passes to a block 176 which indicates a failure in RVDT excitation by setting an RVDT failure flag stored in the RAM 54.

If the blocks 172 and 174 determine that the RVDT is not underexcited, then a block 178 adds the two values representing the signals from the secondary windings of the RVDT and checks to determine whether the total is less than a value denoted HIGHTST. If this is not the case, then the RVDT is overexcited and the RVDT failure flag is set. On the other hand, if the RVDT is not overexcited, then control passes to a block 180.

The block 180 checks to determine whether the analog to digital converter 74 reference voltage is within a particular range of a nominal value. If this is not the case, then a reference failure flag stored in the RAM 54 is set by a block 182.

A block 184 checks to determine whether the temperature sensor signal is within expected values. If this is not the case, then a temperature sensor failure flag stored in the RAM 54 is set by a block 186.

A block 188, FIG. 7B, checks to determine whether a ROM or RAM failure flag has been set by the MEMTST module 102 or the BCKGND module 110. If this is the case, then a memory failure flag stored in the RAM 54 is set by a block 190.

A block 192 then checks to determine whether any of the RVDT failure flag, reference failure flag, temperature sensor failure flag or memory failure flag has been set for two consecutive execution cycles. The block 192 is used to debounce the software so as to prevent noise from affecting the control process. If any of the flags has been set for two consecutive cycles, then a temporary failsafe flag TEMPFG stored in the RAM 54 is set by a block 194.

If none of the failure flags has been set for two consecutive cycles, then a block 196 checks the status of a permanent failsafe flag register PERMFG in the RAM 54 to determine whether it has been set. This flag is discussed in greater detail below and is set in response to a failed test of the valve.

If the permanent failsafe flag PERMFG is not set, then the temporary failsafe flag is reset by a block 198. Control from the blocks 194 and 198 and from the block 196 in the event that the permanent failsafe flag is set passes to a block 200.

It should be noted that if either of the failsafe flags PERMFG or TEMPFG is set, then the valve is commanded to the failsafe position in the CONTRL module.

The block 200 then determines the valve current by detecting the output of the current sensing circuit 72 and determines whether or not this current is within a particular range of the commanded valve current. If this is not the case, then a current failure flag stored in the RAM 54 is set.

A block 204 then checks to determine whether the temperature failure flag is set. If this is not the case, control passes to a block 206, FIG. 7C, which detects the output of the temperature and position sensors 31,32 and checks to determine whether the bleed air temperature is greater than 400° F. and the valve is more than 70% closed. If the temperature of the bleed air is greater than 400° F., it is assumed that the valve is open since this is a higher temperature than can be selected as a set point. However, if the valve is greater than 70% closed, the bleed air temperature may rise even more, thereby causing a bleed air overtemperature condition. In such an event, a block 208 sets a valve failure flag in the RAM 54 and control passes to a block 210.

If the block 204 determines that the temperature sensor failure flag is set, then it has previously been determined that the temperature sensor is faulty and the blocks 206 and 208 are bypassed. These blocks are bypassed since it is impossible to determine whether the bleed air temperature is greater than 400° F.

The block 210 checks to determine whether the current failure flag or the valve failure flag has been set. If this is the case, then a block 212 checks to determine whether either of these flags has been set for four consecutive cycles by checking the contents of a debounce counter in the RAM 54. If this is not the case, then a block 214 implements the debounce counter. A block 216 then updates a register, denoted TSTFG, with all debounced failure flags except the current and valve failure flags. The register TSTFG stores a word containing each of the failure flags which are set or reset in the TESTER module. Control from the block 216 then passes to a block 218.

If the block 212 determines that either or both of the current failure flag or valve failure flag have been set for four consecutive cycles, then the temporary and permanent failsafe flags are set so that the valve is placed in the failsafe state by a block 220. The TESTER module waits a longer time before placing the valve in the failsafe state when a valve fault is sensed than when other types of faults are detected because, once the valve is placed in the failsafe state, there is no way to determine the existence of a valve fault, i.e. whether a valve fault has cleared. Accordingly, the valve is permanently placed in the failsafe state until power is subsequently removed and reapplied to the controller.

Following the block 220, a block 222 updates the register TESTFG with all debounced failure flags and control passes to the block 218.

If the block 210 determines that neither of the current failure or valve failure flags is set, then the debounce counter is reset to zero by a block 224 and control passes to the block 222.

The block 218 checks to determine whether more than two but less than six interrupts have been generated by the watchdog timer in four seconds or whether a failure has occurred in secondary ROM 58. If more than two but less than six interrupts have been generated by the watchdog timer in four seconds, it is initially assumed that there may be a failure in the software or hardware associated with communications between the central computer and the controller, and hence the communications logic 60 is disabled by a high state signal on a line 228 from the output port 82. As previously noted, the protective isolation circuit 88 prevents any fault in the communications logic 60 from affecting the balance of the controller.

The communications function, which is one of the secondary functions of the controller, is permanently disabled until power is removed and then reapplied to the controller. The primary function of controlling bleed air temperature is unaffected by the disabling of the communications function so that an unsafe condition will not arise due to the fault in communications.

Control then passes to the BCKGND module, block 110 in FIG. 4, until the next execution cycle interrupt is received.

The overall function of the TESTER module is to failsafe the valve 30 if a fault is detected in any one of a plurality of components. The control program continues to run even in the event of a fault, and if a fault which occured in certain components subsequently clears, the valve is taken out of the failsafe state and is controlled in accordance with the sensed conditions. However, if the fault occurred in components associated with the valve, the valve is permanently failsafed since a subsequent clearing of the fault cannot be detected due to the valve being placed in the failsafe state. In other words, the valve will be controlled in a normal mode of operation in which the valve is operated in response to the sensed conditions only if the existence of the fault can be detected while in the failsafe mode and the fault ceases to exist during such time.

We claim:

1. In a controller operable in a normal mode of operation wherein an output device is controlled in response to a sensed condition, an improved means for safely operating the output device under fault-producing conditions, comprising:
   means for detecting a fault in the controller or output device;
   means responsive to the fault detecting means for controlling the output device in a failsafe mode of operation wherein the output device is safely operated without regard to the sensed condition when a fault is detected; and
   means responsive to the fault detecting means for returning to the normal mode of operation only if the existence of the fault can be detected while in the failsafe mode and the fault ceases to exist during such time.

2. The improved means of claim 1, wherein the detecting means includes means for sequentially checking individual components of the controller and output device one at a time and wherein the controlling means includes means for initiating the failsafe mode only after a component has been checked and been found to be faulty a predetermined number of times, with the predetermined number being dependent upon the identity of the particular component.

3. The improved means of claim 2, wherein the output device is a flow control valve and wherein the initiating means includes means for accumulating a first number of consecutive fault indications before the failsafe mode is initiated if the fault is in the valve and means for accumulating a second number of consecutive fault indications before the failsafe mode is initiated if the fault is in the controller, where the first number is greater than the second number.

4. The improved means of claim 3, wherein the returning means includes means for permanently operating the flow control valve in the failsafe mode if the first number of consecutive fault indications is accumulated and the fault is in the valve.

5. The improved means of claim 1, wherein the controller also performs a secondary function which is nonessential to the control of the output device, further including means for disabling the secondary function without affecting the control of the output device when a fault is detected which affects only the secondary function.

6. In a controller having means for performing a primary function in which an output device is controlled in response to a sensed condition and means for performing a secondary function which is nonessential to the operation of the primary function, an improved means for maintaining control over the output device under fault-producing conditions, comprising:

means for detecting a fault in the controller;

means responsive to the fault detecting means for disabling the secondary function without affecting the primary function when a fault is detected which affects only the secondary function; and means responsive to the fault detecting means for disabling the primary function when a fault is detected which affects the primary function wherein the disabling means includes means for safely operating the output device without regard to the sensed condition when the primary function is disabled.

7. In a control process implemented in a controller for operating an air flow control valve to control the flow of air passing through a precooler and thereby control the temperature of bleed air from an engine downstream of the precooler, the air flow control valve being controlled in accordance with the temperature of the bleed air downstream of the precooler, the position of the valve and a manually selectable set point, an improved method of safely operating the valve under fault-producing conditions, the method comprising:

detecting the existence of a fault in the valve;

operating the valve in a failsafe mode of operation wherein the valve is fully opened regardless of the temperature downstream of the precooler if the fault in the controller has existed for at least a first predetermined period of time;

detecting the existence of a fault in the controller;

operating the valve in the failsafe mode of operation if a fault in the controller has existed for a second predetermined period of time, where the second predetermined period of time is shorter than the first predetermined period of time; and subsequently operating the valve in response to the temperature downstream of the precooler, the position of the valve and the selected set point if a fault in the controller ceases to exist.

8. In a control process implemented by a controller which operates an output device in response to a sensed condition, the controller having a watchdog timer for generating a signal to reset the controller if an execution cycle interrupt is not received from the controller by the watchdog timer within a predetermined time period following receipt of the immediately preceding execution cycle interrupt, the method of controlling the output device if the watchdog timer is faulty, comprising:

triggering the watchdog timer to begin timing upon receipt of a first execution cycle interrupt;

detecting the receipt of a second execution cycle interrupt following the first interrupt;

checking the status of the watchdog timer when the second interrupt is detected to determine whether the timer has generated a reset signal in the time period between the two interrupts;

operating the output device without regard to the sensed condition if the watchdog timer generated a reset signal between the two interrupts;

detecting the receipt of a third execution cycle interrupt subsequent to the first two interrupts if the watchdog timer did not generate a reset signal between the first two interrupts;

checking the status of the watchdog timer when the third interrupt is detected to determine whether the timer has generated a reset signal in the time period between the second and third interrupts; and operating the output device without regard to the sensed condition if the watchdog timer did not generate a reset signal between the second and third interrupts.

9. In a control process for operating an output device, the control process being implemented in a controller including a power supply for the output device, a drive circuit connected to the power supply and to the output device for controlling the power delivered to the output device in accordance with the level of a control signal which is actuable to cause the output device to assume one of a plurality of states including a failsafe state, means for detecting a fault in the controller and first and second means coupled to the fault detecting means each of which is individually actuable upon occurrence of a fault to cause the output device to assume the failsafe state, an improved method of operating the output device under fault-producing conditions comprising the steps of:

(a) deactuating all but one of the first and second failsafe means and the control signal and actuating the remaining one;

(b) sensing the state of the output device to determine if it is in the failsafe state;

(c) actuating each of the first and second failsafe means and the control signal if the output device is not in the failsafe state; and (d) repeating steps (a)–(c) twice, each time selecting a different one of the first and second failsafe means and the control signal to actuate while the remaining two are deactuated such that the ability of each of the first and second failsafe means and the control signal to cause the output device to assume the failsafe state is determined.

* * * * *